United States Patent Office 3,024,612
Patented Mar. 13, 1962

3,024,612
METHOD FOR REMOVING CALCIUM SULFATE FROM UNDERGROUND STORAGE CAVITIES IN SALT FORMATIONS
Clifford G. Ludeman, Scarsdale, N.Y., assignor to Texaco Development Corporation, New York, N.Y., a corporation of Delaware
No Drawing. Filed Dec. 3, 1957, Ser. No. 700,277
4 Claims. (Cl. 61—.5)

The present invention relates to improvements in the preparation of storage cavities in underground salt formations, such as have been used commercially for several years to store such petroleum products as liquefied petroleum gases. The invention also concerns improvements in the method of operating such cavities for storing liquids.

U.S. Reissue Patent Re. 24,318 discloses the storage of hydrocarbon liquids in huge cavities which are dissolved out of underground salt formations by circulating water therethrough. This is customarily done by drilling a hole into a salt dome or salt bed which may lie hundreds or even thousands of feet below the earth's surface. Then fresh water is circulated through tubing strings down into the hole where it dissolves salt and then up through the tubing strings as saturated brine, which is then run to large storage reservoirs or otherwise disposed of.

It has been found that salt formations usually contain deposits of calcium sulfate interspersed therein. Consequently, as the salt is dissolved to form the concentrated brine the relatively insoluble calcium sulfate falls to the bottom of the cavity and accumulates as detritus. A small part of the calcium sulfate dissolves in the concentrated brine, in which it is more soluble than in water, and is discharged from the hole with the brine. This is not enough, however, to prevent a substantial accumulation of calcium sulfate detritus which may amount to several thousand barrels in a one hundred thousand barrel storage cavity. This insoluble calcium sulfate also accumulates on the walls of the cavity and in fissures therein.

In accordance with the present invention, calcium sulfate is removed from a cavity after the final size has been attained by circulating into and through the cavity a highly concentrated sodium chloride brine solution which is substantially free from dissolved calcium ion, particularly as calcium sulfate. This brine solution dissolves its capacity of calcium sulfate from the film of calcium sulfate on the salt walls, and from the detritus in the cavity, and carries it out of the cavity when discharged therefrom. It does not enlarge the cavity further because its already high concentration of sodium chloride precludes further solution from the walls of the cavity.

The successful operation of the invention depends upon the fact that calcium sulfate is more soluble in brine than in water. The International Critical Tables, Vol. IV, page 286 give the following solubilities in grams per liter at 23° C.:

| Brine Containing Sodium Chloride | Dissolves Calcium Sulfate |
|---|---|
| 0.99 | 2.37 |
| 4.95 | 3.02 |
| 10.40 | 3.54 |
| 30.19 | 4.97 |
| 49.17 | 5.94 |
| 75.58 | 6.74 |
| 129.50 | 7.50 |
| 197.20 | 7.25 |
| 229.70 | 7.03 |
| 306.40 | 5.68 |
| 315.55 | 5.37 |

It is evident that maximum removal of calcium sulfate occurs when the brine concentration is maintained between 75 and 230 grams/liter, although at these values some continued cavity enlargement will occur due to further salt solution. At saturation, the efficiency of calcium sulfate removal is lower, but cavity enlargement is avoided.

While it is immaterial where the calcium ion-free brine is obtained, it is considered most advantageous to treat calcium sulfate saturated brine which is discharged during the formation of the cavity with a chemical compound for precipitating the calcium ion so that the same solution can again be circulated down into the cavity for dissolving more calcium sulfate. This treatment may be accomplished by introducing into the calcium sulfate saturated brine, either during discharge or subsequently, effective quantities of a suitable precipitating compound such as the water soluble carbonate or silicates, for example of ammonium or the alkali metals such as sodium or potassium. Any amount up to the stoichiometric equivalent of the dissolved calcium sulfate may be used successfully. If any excess is used, however, the excess will act to precipitate calcium ion in the salt cavity upon subsequent recirculation of the treated brine. For efficient results the quantity of precipitant should range between ½ and 1 times the stoichiometric equivalent of the dissolved $CaSO_4$, even though the effectiveness increases directly proportionately to the amount of precipitant even at lower values. Other compounds which may be used are water soluble citrates, fluorides, phosphates and oxolates of ammonium or such alkali meals as potassium and sodium. An alternative procedure involves precipitating the calcium ion by passing through a zeolite or other type of ion exchange bed.

The treating compound may be bled into the brine as it flows out of the cavern if desired, and the treated brine then transported to a suitable surface reservoir wherein the precipitate settles to the bottom and leaves the upper layer of brine in condition for recirculation. Alternatively, the precipitation compound may be added to calcium sulfate saturated brine after the brine has entered the surface reservoir. A single reservoir may be employed with brine and precipitant introduced at one end, and brine for recirculation withdrawn at the other end or a point sufficiently remote that settling of precipitate has occurred before reaching that point. The precipitating compounds may be added in the dry condition or as concentrated water solutions.

To assure continuity of operation, the brine should be introduced into two or more reservoirs so that while treating for precipitation is proceeding in one reservoir, treated calcium sulfate-free brine may be taken from another reservoir and introduced into the cavity.

While the solubility of calcium sulfate in brine is not great, the brine is circulated in such huge quantities, such as 10,000 barrels per day, that the total amount of calcium sulfate removed is very large. A particularly important feature of this invention is that the saturated brine employed will not dissolve any more sodium chloride from the formation within which the cavern is located. Consequently the described steps for removing calcium sulfate can be performed successfully without expanding the size of the cavern beyond that desired.

Once a cavern has been completed, but is still laden with a quantity of calcium sulfate detritus, the liquid to be stored ordinarily is pumped down through the tubing strings into the cavity and displaces the brine up through the tubing strings to a storage reservoir. If the stored liquid is a hydrocarbon such as liquefied petroleum gas, it floats on top of the brine in the cavern. The same procedure can be used even with a liquid of greater specific gravity than brine, upon which the brine will float.

The brine which is dispelled from the cavern is then treated in the storage reservoir in the manner described above to precipitate the calcium sulfate. Then when it becomes time to remove the stored liquid from the cavern, the treated brine is again pumped down through the tubing strings into the cavern and displaces the stored liquid up through the tubing strings to a suitable receptable. The brine then dissolves a substantial part of the residual calcium sulfate detritus in the cavern and carries it with it from the cavern the next time liquid is stored therein. Every time the cycle is repeated more calcium sulfate is removed.

*Example I*

A storage cavity is washed out 1,000 feet below the surface of the earth in a Texas salt dome by circulating 10,000 barrels per day of relatively fresh water down through the tubing strings into the salt formation and then back up through the tubing strings as concentrated sodium chloride brine which is also substantially saturated with calcium sulfate. The brine is discharged into a large reservoir wherein it is treated with a saturated sodium carbonate (soda ash) solution in the ratio of 1.5 pounds of $Na_2CO_3$ per barrel of brine to precipitate substantially all of the calcium ion from the brine. The washing operation is continued until the cavity size is 100,000 barrels, whereupon the treated calcium sulfate-free brine from the reservoir is circulated down into the cavity and out again at the rate of 10,000 barrels per day to dissolve calcium sulfate from the film on cavern walls and from the accumulated detritus on the floor of the cavern. As the brine leaves the cavern it is delivered to a second reservoir wherein it is again treated with sodium carbonate in the same ratio to place it in condition for recycling through the cavern.

*Example II*

A storage cavity is washed out 1,000 feet below the surface of the earth in a Texas salt dome by circulating 10,000 barrels per day of relatively fresh water down through the tubing strings into the salt formation and then back up through the tubing strings as concentrated sodium chloride brine which is also substantially saturated with calcium sulfate. The brine is discharged into a first end of a large surface reservoir and a concentrated commercial sodium silicate or water glass solution containing 40% $Na_2SiO_3 \cdot SiO_2$ is added thereto in the proportion of 6.45 pounds per barrel of brine to precipitate substantially all of the calcium ion from the brine. After the cavity size has grown to about 100,000 barrels, treated calcium sulfate-free brine is withdrawn from the opposite end of the reservoir and recirculated into the cavity and out again at the rate of 10,000 barrels per day to dissolve calcium sulfate from the film on the cavern walls and from the accumulated detritus. As the brine leaves the cavern it is again delivered to the first end of the reservoir and treated with sodium silicate solution in the same ratio to place it in condition for recycling through the cavern.

Obviously, many modifications and variations of the above invention as hereinbefore set forth may be made without departing from the spirit and scope thereof, and therefore, only such limitations should be imposed as are indicated in the appended claims.

I claim:
1. A method for creating an underground storage cavern in a sodium chloride salt formation also containing calcium sulfate deep below the surface of the earth comprising circulating substantially fresh water down into said salt formation and dissolving salt therefrom to form concentrated brine and leave a cavity containing calcium sudfate detritus, discharging said brine from said cavern, when said cavern reaches a desired size circulating down into said cavern saturated sodium chloride brine which is substantially free from dissolved calcium ion and dissolving therein calcium sulfate from the detritus in said cavern without dissolving more sodium chloride, and then discharging from said cavern said sodium chloride brine containing dissolved calcium sulfate, precipitating the calcium ion from the discharged brine, and recirculating the brine so treated into said cavern to dissolve more calcium sulfate.

2. A method in accordance with claim 1 wherein said calcium ion is precipitated by reacting sodium carbonate with said brine.

3. A method in accordance with claim 1 wherein said calcium ion is precipitated by reacting sodium silicate with said brine.

4. A method for operating a completed storage cavern in a salt formation deep below the surface of the earth, said cavern also containing calcium sulfate detritus, said method comprising introducing into said cavern a hydrocarbon liquid to be stored having a lower specific gravity than a saturated sodium chloride brine solution, thereafter recovering said stored liquid from said cavern by introducing therein said saturated sodium chloride brine solution which is substantially free from dissolved calcium ion, said solution acting to dissolve calcium sulfate from said detritus without dissolving substantially more sodium chloride, and thereafter again storing hydrocarbon liquid in said cavern by forcing it down into said cavern and displacing said brine therefrom to the surface of the earth thereby removing calcium sulfate from said cavern, treating the displaced brine to precipitate calcium ion therefrom, and thereafter again using said brine for displacing stored liquid from said cavern.

References Cited in the file of this patent

UNITED STATES PATENTS

| 2,161,800 | Cross | Apr. 10, 1937 |
| 2,787,455 | Knappen | Apr. 2, 1957 |
| 2,934,419 | Cook | Apr. 26, 1960 |

FOREIGN PATENTS

| 535,204 | Canada | Jan. 1, 1957 |

OTHER REFERENCES

The Oil and Gas Journal, Aug. 17, 1953, pg. 84.
The Oil and Gas Journal, Apr. 27, 1953, pgs. 192, 194, 197 and 198.